March 7, 1933.   F. W. GAY   1,900,495
CAPACITOR PROTECTOR
Filed July 18, 1931   2 Sheets-Sheet 1
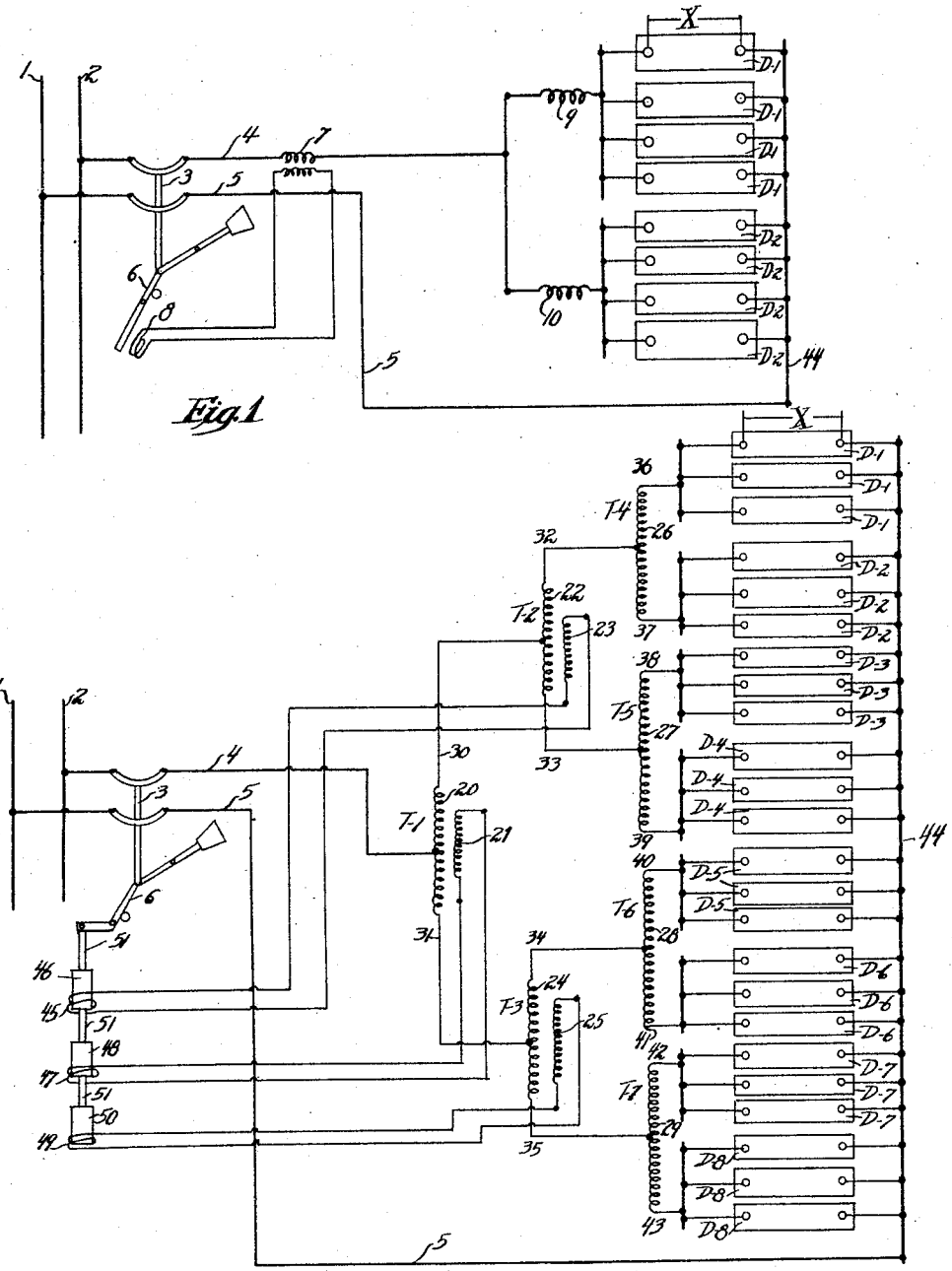
INVENTOR.
Frazer W. Gay March 7, 1933. F. W. GAY 1,900,495
CAPACITOR PROTECTOR
Filed July 18, 1931  2 Sheets-Sheet 2
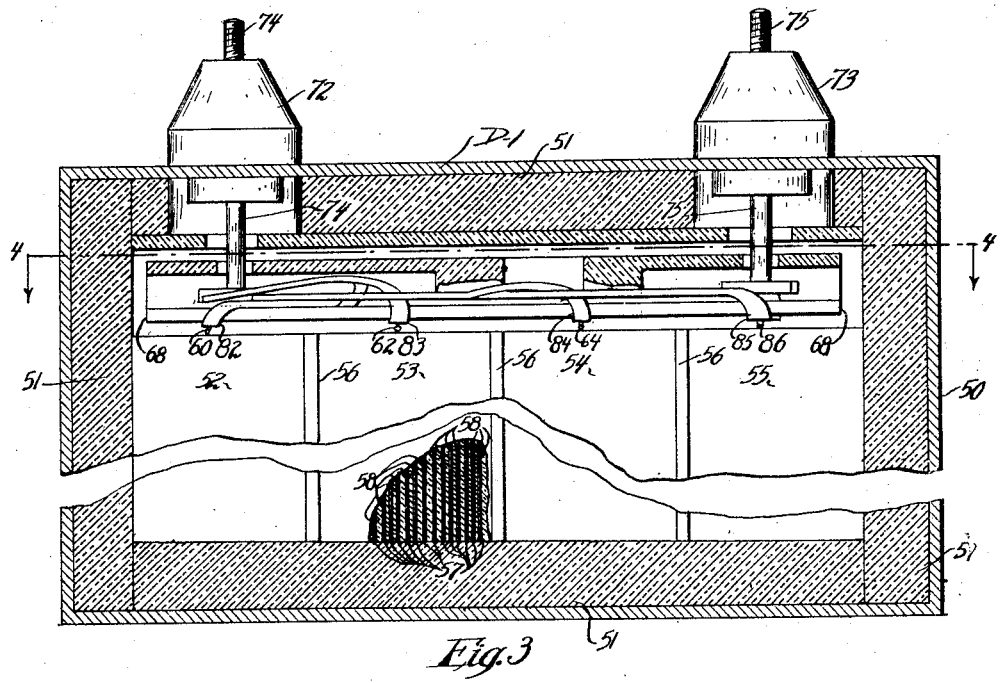
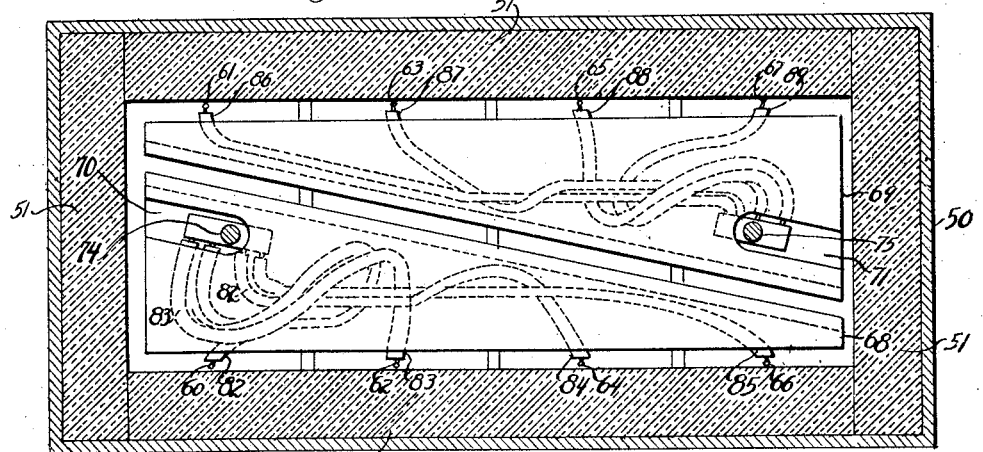
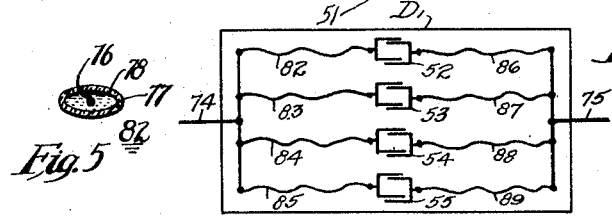
INVENTOR.
Frazer W. Gay, Patented Mar. 7, 1933

1,900,495

UNITED STATES PATENT OFFICE

FRAZER W. GAY, OF NEWARK, NEW JERSEY

CAPACITOR PROTECTOR

Application filed July 18, 1931. Serial No. 551,670.

This invention relates to a novel means for preventing the flow of heavy power current into a capacitor unit when it fails by short circuiting.

Heretofore capacitors have not been extensively used in large sizes for two reasons. 1st. In case of a failure of a single unit in a capacitor, the entire capacitor would discharge its stored energy almost instantly into the faulty capacitor unit, causing the hermetically sealed oil tank containing the units to explode and scatter its contained oil in the neighborhood of the explosion. 2nd. A great power current would flow from the power system into the defective capacitor unit sufficient to explode its containing tank, provided said tank had survived the initial capacity discharge and severe burning and destruction would follow. In many cases the oil splashed by the explosion would be ignited.

An effort has been made by several manufacturers to limit the current flowing to a defective capacitor unit by means of a relatively high resistance resistor installed in series with a fuse in the circuit of each bank of capacitor units sealed in an oil tank. This arrangement is satisfactory where only a few banks of units are used on a small system. 1st. Because the total capacity in the capacitor is small and it is able to almost instantly discharge its energy through the relatively high resistance of the fuse. 2nd. Because the system voltage is reduced by reason of the power current flowing through the resistor and fault after the capacitors have substantially discharged their energy. After the discharge current has subsided, the fuse is able to rupture the current to the fault and the relatively low power current flowing to the fault will at the instant of current rupture in the fuse be transferred to the capacitor and the rise of the recovery voltage across the fuse will be at a relatively slow rate.

On large systems, especially where the capacitor is also very large, a failure of one capacitor unit will not discharge its associated capacitor units through its relatively high resistance resistor, nor will the heavy current flowing from the power circuit to the fault materially lower the voltage at the defective capacitor unit terminals. It therefore becomes necessary for the fuse to open the relatively high short circuit current at full line voltage. The attempt to make a resistor and fuse unit accomplish so great a task results in an expensive resistor and fuse unit which is still unreliable in operation.

On large systems, especially where a relatively large capacitor is installed, I propose to divide up the total capacitor into groups, each group consisting of a plurality of banks of units, each such bank of units being sealed in a tank of oil in the conventional manner, and I further propose to place a reactor in series with each such group. This reactor should have a reactance value which will limit the current flowing from the power circuit through the fuse and defective capacitor unit to such a value that an inexpensive fuse will be able to rupture the current, yet the drop through a reactor feeding a capacitor group will not be more than a few per cent under normal load conditions. In the case of very large capacitors I propose to use a net work of midtapped reactors or midtapped auto transformers. These auto transformers have a relatively low impedance to balanced normal frequency currents but a relatively very high impedance to high frequency condenser discharge currents to a fault. Such a net work of midtapped auto transformers can be arranged to allow a relatively small increase in normal frequency current to flow through a short circuited unit so that a small cheap fuse will open the circuit of the defective capacitor unit with great reliability.

I further propose to provide a trip circuit for the circuit breaker through which the entire capacitor receives its current from the power line so that should any individual fuse fail to properly open the circuit of a defective capacitor unit, the circuit breaker will be tripped and disconnect the entire capacitor.

An object of this invention is to provide an inductive reactance in series with a group of capacitor units so that the voltage impressed on said group of capacitor units may be reduced to a low value by the failure of one said capacitor unit and the recovery voltage following the opening of the fuse or other valve may be caused to rise slowly by reason of the relatively slow charging of the group of capacitor units following the rupturing of the current by said fuse or valve.

It is a further object of this invention to provide such a current limiting means cooperating with a group of capacitor units that the disconnecting of a defective capacitor unit may be reliably effected by a fuse cut out.

It is a further object of this invention to provide a current limiting means which will effectively prevent any large increase of current flowing to a group of capacitor units containing one or more defective units, and to further provide means for reliably disconnecting the entire group of capacitor units should the fuse cut out in series with any defective unit fail to function to rupture the short circuit flowing through such unit.

It is a further object of this invention to provide a plurality of fuse cut outs within the oil tank containing a corresponding plurality of capacitor units and to so protect them against capacitor discharge currents and power short circuit currents that they will be able to cut out a defective capacitor unit without danger of exploding the tank which contains them.

Other objects of this invention, not at this time more particularly enumerated, will be clearly understood from the following description of the same.

The invention is clearly illustrated in the accompanying drawings, in which:—

Fig. 1 is a diagrammatic representation of two groups of capacitor units, each group protected by a reactor.

Fig. 2 is a diagrammatic representation of a preferred form.

Fig. 3 is a drawing of a capacitor in cross section showing units within a tank, each unit protected by an individual fuse.

Fig. 4 is a drawing of a horizontal cross section of the capacitor shown in Fig. 3 taken along the line 4—4.

Fig. 5 is a cross section of my novel fuse connector shown in Fig. 4.

Fig. 6 is a diagrammatic view of a capacitor group showing the elements of the capacitor group in conventional form.

Fig. 1 shows an alternating current circuit 1, 2 to which are connected two banks of capacitor groups D1, D1, D1, D1 and D2, D2, D2, D2 through the reactors 9 and 10 respectively, and the leads 4, 5 and circuit breaker 3. A current transformer 7 has its primary connected in the wire 4 and its secondary is connected to the trip coil 8 operating the trip 6, associated with circuit breaker 3.

Fig. 2 shows a preferred form of the invention in which 1, 2 is an alternating current circuit to which the supply wires 4, 5 are connected through circuit breaker 3. Supply wire 4 is connected to the mid point of primary winding 20 of transformer T—1. One terminal 30 of this winding 20 is connected to the mid point of the primary winding 22 of transformer T—2 while the other terminal 31 is connected to the mid point of the primary winding 24 of transformer T—3. One terminal 32 of the winding 22 of transformer T—2 is connected to the mid point of the winding 26 of auto transformer T—4, while the other terminal 33 is connected to the mid point of the winding 27 of auto transformer T—5. One terminal 34 of winding 24 of transformer T—3 is connected to the mid point of the winding 28 of auto transformer T—6, while the other terminal 35 is connected to the mid point of the winding 29 of the auto transformer T—7.

The bank of capacitor groups D1, D1, D1, is connected in multiple between the terminal 36 of transformer T—4 and the common bus wire 44. Bus wire 44 is connected to phase wire 1 by wire 5. The bank of capacitor groups D2, D2, D2 is connected in multiple between the terminal 37 of transformer T—4 and the common bus wire 44. The bank of capacitor groups D3, D3, D3 is connected between the terminal 38 of transformer T—5 and common bus wire 44. The bank of capacitor groups D4, D4, D4 is connected between the terminal 39 of transformer T—5 and common bus wire 44. The bank of capacitor groups D5, D5, D5 is connected between the terminal 40 of transformer T—6 and common bus wire 44. The bank of capacitor groups D6, D6, D6 is connected between the terminal 41 of transformer T—6 and common bus wire 44. The bank of capacitor groups D7, D7, D7 is connected between the terminal 42 of transformer T—7 and common bus wire 44. The bank of capacitor groups D8, D8, D8 is connected between the terminal 43 of transformer T—7 and common bus wire 44.

Figs. 3 and 4 show a plurality of capacitor units 52, 53, 54, 55 assembled in a steel tank 50 to form a capacitor group D1. (Fig. 1.) These capacitor units are protected against grounding to the tank wall by insulation 51 surrounding the capacitor units on all sides and against short circuiting to each other by the insulating separators 56. A section of capacitor unit 53 is broken away to show the customary alternate layers of conducting foil and insulation 57 and 58 respectively. Alternate layers of foil are connected to capacitor unit terminal 62 and the remaining alternate layers of foil to terminal 63.

The top of capacitor tank 50 is assembled with standard insulating bushings 72 and 73 in place. Two tapered molded channels 68 and 69 have slots 70 and 71 cut to receive the bushing studs 74 and 75. Insulated connecting wires 82, 83, 84, and 85 are secured to bushing stud 74 and connecting wires 86, 87, 88, and 89 are secured to bushing stud 75. The wires connected to stud 74 are kept apart from and insulated from the wires connected to stud 75 by the molded channels 68 and 69. Capacitor unit 52 has its two terminals 60 and 61 connected to studs 74 and 75 by leads 82 and 86 respectively. In the same manner capacitor units 53, 54, and 55 are connected to studs 74 and 75 by leads 83, 87; 84, 88; and 85, 89 respectively. The leads 82 to 89 constitute fuses and a cross section of one of these fuse connecting leads as 82 (Fig. 4) is shown in Fig. 5. A flexible insulating wall 77 is preferably made by winding bias cut varnished cambric tape on a cylindrical form. The hollow tube thus formed is rolled so as to flatten it. The fuse wire 76 is threaded through the flattened hole to make the combination fuse and lead 82.

The operation of this device is as follows. If a short circuit occurs as at X Fig. 1 in the capacitor group D1 as by failure of a capacitor unit as 53, Fig. 3, then the remaining capacitor groups D1, D1, D1 as well as units 52, 54, 55 will discharge through the fault X and reduce the voltage across the capacitor groups D1, D1, D1 to approximately zero. Such a failure will occur when the voltage across the capacitor groups D1, D1, D1, D1 is approximately a maximum i. e., when the capacitor groups are approximately fully charged and the current to the capacitor groups is approximately zero. The fuse connectors 83, 87 have a resistance adjusted to limit the discharge current to a value sufficient to prevent violent oscillation of current in the capacitor units but not sufficient to delay the discharge of the capacitors more than a very small fraction of a cycle. The size of the wire 76 (Fig. 5) is so chosen that it will be completely volatilized by the discharge and will rupture the current as soon as the discharge is over. The power current which meanwhile has built up in the reactor 9 will transfer from the fault X to the good capacitor groups D1, D1, D1.

If a fault occurs in the insulation of a unit in the preferred form as at X Fig. 2, the capacitor groups D1, D1, D1 will discharge through the fault and reduce the voltage across the defective unit to zero. The voltage X across the entire winding 26 of transformer T—4 is substantially equal to the voltage across the capacitor groups D2, D2, D2. Now if transformers T—1 to T—7 are not saturated and trip coils 45, 47, 49 are made of very high resistance the two halves of the primary windings of each transformer T—1 to T—7 respectively must carry the same current since they will act as auto transformers. This can only follow if the fault X and capacitor groups D2 etc.; D3 etc.; D4 etc.; D5 etc.; to D8 etc. each carry the same current and this in turn can only follow if the voltages on all the non shorted reactor groups are equal. Therefore if the voltages across entire windings 26, 22 and 20 of transformers T—4, T—2, and T—1 are $X$, $Y$, and $Z$ respectively then $X$ equals $X/2$ plus $Y$ since the voltage from terminal 33 of transformer T—2 to bus wire 44 is substantially $X$; and $X$ equals $X/2$ plus $Y/2$ plus $Z$ since the voltage from terminal 31 of transformer T—1 to bus wire 44 is substantially $X$; and $X/2$ plus $Y/2$ plus $Z/2$ equals 100% or the line voltage across wires 4, 5 since the voltage across the upper half of winding 26, plus the voltage across the upper half of winding 22, plus the voltage across the upper half of winding 20, equals substantially the total voltage between bus wire 44 and lead 4. Solving the above equations we find $X$ equals $114\,2/7\%$, $Y$ equals $57\,1/7\%$, and $Z$ equals $28\,4/7\%$. It follows therefore that during the time of fault the voltage on the non faulty groups D2 to D8 is increased 1/7 and the current flowing to these groups is increased 1/7. Now since the current in each half of the auto transformers must be substantially the same it follows that the current flowing to the D1 group will also be increased 1/7.

We have shown three capacitor groups D1, D1, D1 in the short circuited bank and each group having four units, (Figs. 3 and 4). Therefore during the instant of fault in unit 53 the entire fault current will flow through fuses 83, 87, or 13 5/7 times the normal current in these fuses. This current is sufficient to blow these fuses almost instantly. After the fault has been removed, capacitor unit 53 will be removed from the circuit and the remaining eleven units will be compelled to carry the current. As a result transformers T—1 to T—7 will adjust the voltages so that the voltage on the D1 bank will be 108 1/3% of what it is on the remaining banks. Should the fuse at X fail to rupture the current in approximately one cycle the sustained pull on armatures 46, 48, and 50 will cause the breaker trip 6 to operate and open circuit breaker 3. Also if several capacitor units in a single bank as say D1 short circuit and cut out, the sustained voltage across transformers T—1 to T—7 will build up to an appreciable value and sufficient current will flow in trip coils 45, 47, 49 to open breaker 3 and disconnect all the capacitors. It is to be understood that the inertia of armatures 46, 48, and 50 is so great that the momentary building up of voltage during the very short period that fuses 83 and 87 take to blow out will not pull these armatures and trip breaker 3.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In a power transmission system, a power transmission line, a plurality of capacitor groups, each of said capacitor groups comprising, a plurality of interconnected capacitor units and a plurality of fuse means, each of said fuse means being respectively connected in series with a respective one of said capacitor units, a plurality of reactor elements, each of said capacitor groups being independently connected to a terminal of a respective one of said reactor elements, the remaining terminal of each of said reactor elements being connected to receive power from said transmission line, so that the failure of one capacitor unit of any one of said capacitor groups causes the remaining capacitor units of said capacitor group to be discharged through said defective capacitor unit and effect the rupture of the fuse means connected in series with said defective capacitor unit, said reactor elements serving to retard the flow of current from said remaining capacitor groups to said capacitor group having the defective capacitor, whereby the recovery of voltage across the blown fuse means is built up relatively slowly.

2. In a power transmission system, a power transmission line having a pair of line conductors, a plurality of banks of capacitor groups, the capacitor groups of each bank being connected in parallel, each of said capacitor groups comprising, a plurality of capacitor units and a plurality of pairs of fuse elements, each pair of fuse elements being respectively connected in series with a respective one of said capacitor units, the several capacitor units and their series connected fuse elements of each capacitor group being connected in parallel, a plurality of reactor elements, each of said banks of capacitor groups having one side thereof respectively connected to a terminal of a respective one of said reactor elements, the remaining terminals of said reactor elements being connected to one of said line conductors, the other of said line conductors being connected to the other side of each of said capacitor units.

3. In a power transmission system, a power transmission line, a plurality of capacitor groups, each of said capacitor groups comprising, a plurality of interconnected capacitor units and a plurality of fuse means, each of said fuse means being respectively connected in series with a respective one of said capacitor units, a plurality of auto transformers, each of said auto transformers comprising two equal reactor elements, said two reactor elements of each of said auto transformers having adjacent ends connected together to form the mid-point of the auto transformer, the said reactor elements of two of said auto transformers having their outer ends respectively connected to one side of respective capacitor groups, while the said reactor elements of a third of said auto transformers have their outer ends connected respectively to the mid-point of said two auto transformers, the mid-point of said third auto transformer and the other side of each of said capacitor groups being connected to said transmission line for receiving power therefrom, so that the failure of one capacitor unit of any one of said capacitor groups causes the remaining capacitor units of said capacitor groups to be discharged through said defective capacitor unit and effect the rupture of the fuse means connected in series with said defective capacitor unit, said transformer reactor elements serving to retard the flow of current from said remaining capacitor groups to said capacitor group having the defective capacitor, whereby the recovery of voltage across the blown fuse means is built up relatively slowly.

4. In a power transmission system, a source of power having a plurality of conductors, a plurality of capacitors, a plurality of mid-tapped auto transformers, each of said capacitors having one side thereof respectively connected to a respective winding terminal of certain of said auto transformers for receiving power from the latter, others of said auto transformers having their mid-taps supplied with power from one of said power conductors and their winding terminals connected respectively to the respective mid-taps of said certain transformers for supplying power to the latter, the other side of each of said capacitors being connected to another of said power conductors.

5. In a power transmission system, a source of power having a plurality of conductors, a plurality of capacitors, a plurality of mid-tapped auto transformers, each of said capacitors having one side thereof respectively connected to a respective winding terminal of certain of said auto transformers for receiving power from the latter, others of said auto transformers having their mid-taps respectively connected to a respective winding terminal of still another auto transformer and their winding terminals connected respectively to the respective mid-taps of said certain transformers for supplying power to the latter, said last named auto transformer having its mid-tap connected to one of said power conductors for receiving power therefrom, the other side of each of said capacitors being connected to another of said power conductors.

In testimony that I claim the invention set forth above I have hereunto set my hand this 17th day of July, 1931.

FRAZER W. GAY.